No. 863,795. PATENTED AUG. 20, 1907.
G. J. HENRY, Jr.
HYDRAULIC NOZZLE SUPPORT.
APPLICATION FILED JUNE 3, 1903.

WITNESSES:

INVENTOR:
Geo. J. Henry, Jr.
by N. A. Acker
his atty.

UNITED STATES PATENT OFFICE.

GEORGE J. HENRY, JR., OF SAN FRANCISCO, CALIFORNIA, ASSIGNOR OF ONE-HALF TO THE PELTON WATER WHEEL COMPANY, OF SAN FRANCISCO, CALIFORNIA, A CORPORATION OF CALIFORNIA.

HYDRAULIC-NOZZLE SUPPORT.

No. 863,795. Specification of Letters Patent. Patented Aug. 20, 1907.

Application filed June 3, 1903. Serial No. 159,940.

*To all whom it may concern:*

Be it known that I, GEORGE J. HENRY, Jr., a citizen of the United States, residing in the city and county of San Francisco, State of California, have invented certain new and useful Improvements in Hydraulic-Nozzle Supports; and I do hereby declare the following to be a full, clear, and exact description of the same.

The present invention relates to a take up attachment or support for use in connection with what is known as deflecting nozzles, generally used for directing a stream of water, or an impact fluid stream onto the buckets or vanes of a motor wheel, the object of the invention being to relieve the bearings for the nozzle of the strain thereon due to the thrust of the said nozzle.

Owing to the curvature of the nozzle or the angle at which it stands relative to the main supply or pipe line, the head pressure of water from the said main supply or pipe line, tends to force the said nozzle outward laterally and to place a back strain or pressure upon the outer bearing for the nozzle and a forward strain on the inner bearing thereof. The strain thus transmitted to or placed upon the bearings weaken the same to such an extent that ofttimes the nozzle connection is entirely destroyed at such points. It is this weakening of the bearings which the present invention is designed to obviate.

To comprehend the invention reference should be had to the accompanying sheet of drawings, wherein—

Figure 1:
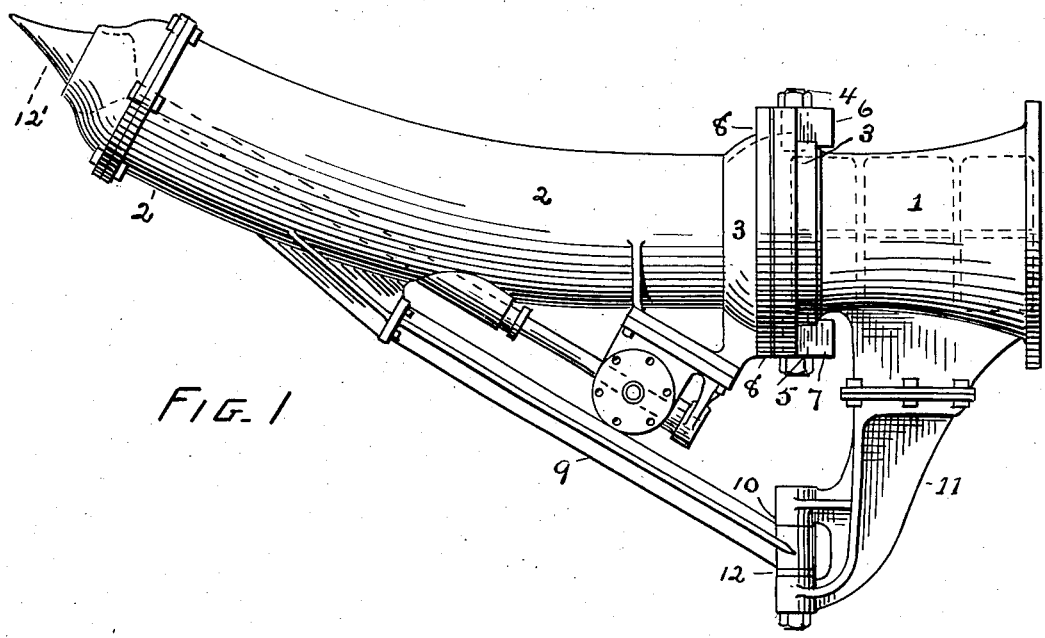
Figure 2:
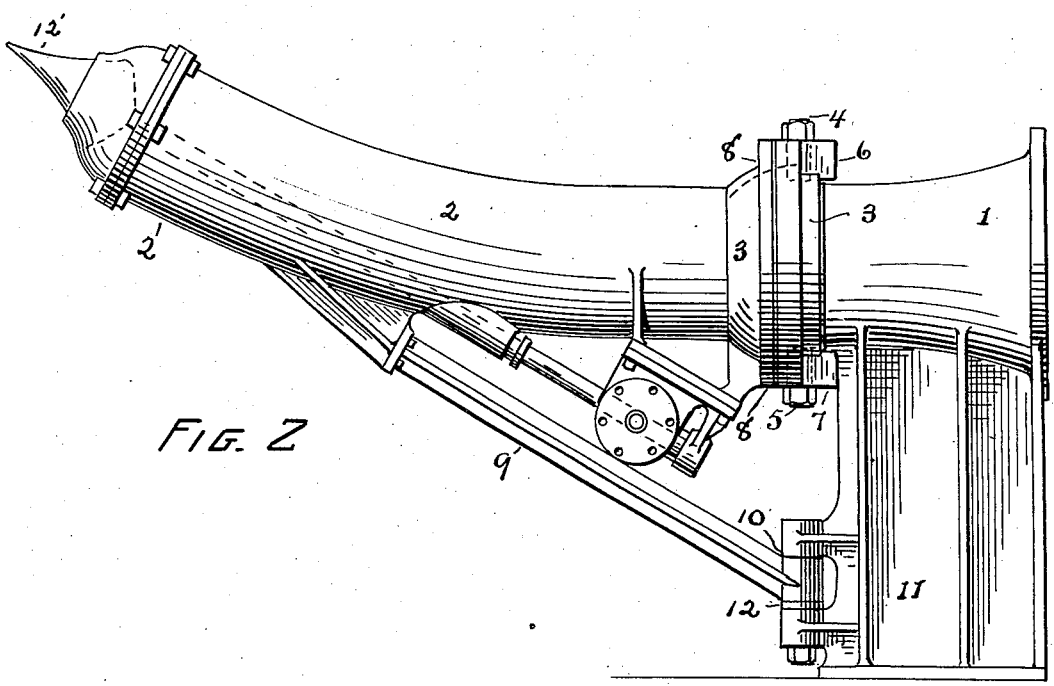

Figure 1 is a plan view disclosing the general arrangement of the parts, the nozzle being arranged to swing in a vertical plane, the usual movement provided for; and Fig. 2 is a side view in elevation of the mechanism disclosed in Fig. 1 of the drawings, the nozzle being arranged to swing in a horizontal plane or laterally.

The numeral 1 is used to indicate the main supply or pipe line, and 2 the nozzle, which is connected thereto by the spherical joint 3. From the lower end of the main supply pipe project the bearing pins, studs or trunnions 4, 5, which are engaged by the brackets 6, 7, of the supporting ring 8. This ring surrounds the upper end of the nozzle or the outer spherical section of the joint 3, the object of which ring 8 is to take the weight of the nozzle from the spherical joint so that the free movement of the nozzle is not interfered with.

The nozzle 2 is slightly curved, as shown, consequently the pressure of the water flowing therethrough exerts an outward lateral strain as constructed under Fig. 1 of the drawings, or a downward strain, as constructed under Fig. 2 of the drawings, upon the nozzle, which, through the supporting ring 8 is transferred onto the bearing pins, studs or trunnions 4, 5.

To relieve the bearing pins, studs or trunnions 4, 5, of the strain incident to the reaction pressure of the water onto the nozzle 2, there is provided a strut 9. This strut is attached at one end, in any suitable manner, to the outer end portion of the nozzle 2, its opposite end being connected by a hinge 10 to a suitable support 11. In the present case this support is illustrated as a bracket extending from the main supply or pipe line. The hinge 10 for the strut for the back thrust or compression of the nozzle 2 is in the same line as the bearings for the nozzle, so that the swinging movement of the nozzle is not interfered with. Wearing rings or roller bearing 12 being incorporated in the hinge joint 10 to compensate for wear and reduce friction. By this form of connection the reacting water strain of the nozzle is transposed or removed from off the bearings for the nozzle onto the support for the strut 9.

By the described invention, that is, interposing between a swinging nozzle and a suitable support, a strut for the water strain or nozzle thrust, approximately all such strain is removed from the bearings for the swinging nozzle, the life and utility of the nozzle being thus materially prolonged.

Within the nozzle works the usual regulating plug 12′, used for controlling the outlet area of the nozzle.

Having thus described the invention, what is claimed as new and desired to be protected by Letters Patent, is—

1. The combination with a main supply pipe, of a discharge nozzle movably connected thereto, a strut attached to the outer end of the movable nozzle, a fixed support for the opposite end of the strut, and a hinge between the fixed support and the strut, the bearing of the hinged connection for the strut being in line with the axis of the nozzle's joint.

2. The combination with a supply pipe, of a deflecting nozzle, movably connected thereto by a swinging joint supporting bearings for the nozzle, a strut interposed between the deflecting nozzle and a fixed support to which the strut is hinged at its inner end, the outer end of the said strut being attached to the nozzle, said strut being hinged to swing with the nozzle.

3. The combination with a hydraulic nozzle, of a main line or supply pipe to which the nozzle is movably united, of bearings upon which the nozzle swings, a strut interposed between the swinging nozzle and a fixed support, said strut being hinged to the fixed support to swing with the nozzle, and receiving the thrust of the nozzle in order to relieve the bearings of the strain thereof, the bearing of the hinged strut being in line with the axis of the nozzle's joint.

4. The combination with a pivoted or deflectable nozzle for directing a stream upon the buckets of an impact wheel, of a fluid supply pipe to which the said nozzle is pivoted, means within the nozzle beyond its pivotal joint or bearing for regulating the jet discharged therefrom, a fixed support outside of the fluid supply pipe, and a rigid connection between the nozzle and the fixed support, said connection being pivoted to the said fixed support and receiving the nozzle's thrust in order to relieve the pivotal joint or bearing for the nozzle of the strain thereof.

5. In a support for pivoted nozzles for directing a stream upon the buckets of an impact wheel, the combination with a fluid supply pipe, of a nozzle pivotally mounted at two diametrically opposite points outside the bore of said supply pipe, said nozzle being bent or curved forward of the supply pipe in the same plane as that occupied by its pivotal points, means arranged forward of said pivotal points for regulating the jet discharged by the nozzle, and means for relieving the nozzle pivots of the nozzle thrust.

6. A hydraulic apparatus consisting of a nozzle rigid throughout and of curved form, means for varying the amount of discharge from the tip of the nozzle, a supply pipe, a pivot connecting the nozzle and pipe, an axis of movement of the nozzle being at right angles to the direction of flow at the axial point and located in the plane of the bend of the nozzle, and means for relieving said pivot of the nozzle thrust.

7. In a hydraulic apparatus in which a bent rigid nozzle is provided with a valve regulating the discharge at the tip, the combination with said nozzle and valve, and with a main supply pipe, of a pivot connecting the nozzle and pipe and located at right angles to the direction of flow at the axial point and in the plane of the bend of the nozzle, and means for relieving said pivot of the nozzle thrust.

8. In a hydraulic apparatus, a supply pipe, a nozzle pivotally connected thereto whereby it may swing laterally, and a brace connected at one end to the nozzle at a point intermediate its connection with the supply pipe and its discharge end and bearing at its opposite end against an abutment fixed against movement longitudinally of the brace but permitting movement of the brace in consonance with the shifting of the nozzle.

9. In a hydraulic apparatus, a supply pipe, a nozzle pivotally connected thereto whereby it may swing laterally, and a brace connected at one end to the nozzle and bearing at its opposite end against an abutment fixed against movement longitudinally of the brace, said brace being arranged whereby it offers no obstruction to the swinging of the nozzle.

10. In a hydraulic apparatus, a supply pipe, a curved nozzle pivotally connected thereto whereby it may swing laterally, and a brace connected at one end to the convexed side of the nozzle and bearing at its opposite end against an abutment fixed against movement longitudinally of the brace but permitting movement of the brace in consonance with the shifting of the nozzle.

11. In a hydraulic apparatus, a supply pipe, a curved nozzle pivotally connected thereto whereby it may swing laterally, and a rigid brace rod for relieving the nozzle pivot of the nozzle thrust.

12. In a hydraulic apparatus, a supply pipe, a curved nozzle pivotally connected thereto whereby it may swing laterally, and means independent of the pivotal bearing of the nozzle for relieving the pivot of the nozzle thrust.

13. The combination with the supply pipe of a curved nozzle pivoted to said pipe, and a bearing supplemental to the pivot arranged to resist the strains resulting from the reactive force of the jet tending to deflect the nozzle.

14. In an impact motor apparatus, a supply pipe, a curved nozzle hinged thereto, and a support for the nozzle arranged to receive the strain tending to deflect the nozzle under the re-active force of the jet, said support having a part in line with the axis of the joint of the nozzle, substantially as set forth.

15. In an impact motor apparatus, a supply pipe, a curved nozzle hinged thereto and a support for the nozzle arranged to receive the strain tending to deflect the nozzle under the re-active force of the jet, said support having a center in line with the axis of the joint of the nozzle, substantially as set forth.

16. The combination with the curved nozzle of an impact water motor pivoted at the inner end, of means supplemental to the pivot for resisting any movement of the outer end of the nozzle, whatever its position, under the reactive force of the jet.

In witness whereof I have hereunto set my hand.

GEORGE J. HENRY, Jr.

Witnesses:
WALTER F. VANE,
D. B. RICHARDS.